United States Patent [19]
Afsenius

[11] Patent Number: 5,969,859
[45] Date of Patent: Oct. 19, 1999

[54] BINOCULAR NIGHT VISION GOGGLES, WHERE ONE OCULAR COULD BE MOVED FROM THE BEAM PATH

[75] Inventor: Sven-Åke Afsenius, Lidingö, Sweden

[73] Assignee: Simrad Optronics A/S, Oslo, Norway

[21] Appl. No.: 09/091,771
[22] PCT Filed: Oct. 31, 1996
[86] PCT No.: PCT/SR96/01323
    § 371 Date: Jun. 22, 1998
    § 102(e) Date: Jun. 22, 1998
[87] PCT Pub. No.: WO98/19199
    PCT Pub. Date: May 7, 1998
[51] Int. Cl.⁶ .......................... G02B 23/00; G02B 27/02
[52] U.S. Cl. ...................... 359/409; 359/411; 359/480
[58] Field of Search .................................. 359/407, 408, 359/409, 410, 411, 381, 480, 481; 250/214 VT

[56] References Cited

U.S. PATENT DOCUMENTS

| 4,449,787 | 5/1984 | Burbo et al. | 313/524 |
| 4,984,879 | 1/1991 | Plunkett | 359/408 |
| 5,296,962 | 3/1994 | Furuhashi | 359/388 |
| 5,307,204 | 4/1994 | Dor | 359/400 |
| 5,331,459 | 7/1994 | Dor | 359/409 |
| 5,446,585 | 8/1995 | Morley et al. | 359/411 |
| 5,886,814 | 3/1999 | Afsenius | 359/407 |

FOREIGN PATENT DOCUMENTS

| 450 671 | 7/1987 | Sweden . |
| 467 278 | 6/1992 | Sweden . |

Primary Examiner—Cassandra Spyrou
Assistant Examiner—Mark A. Robinson
Attorney, Agent, or Firm—Young & Thompson

[57] ABSTRACT

A compact night observation viewer has one light amplifier and two eyepieces in the horizontal plane under the input aperture, and where one eyepiece can be folded out of the beam path so that a free through-view passage is opened through the viewer, whereby the observed scene can also be observed without light amplification. The invention solves thereby the problem of how in a technically and economically satisfactory way it is able to freely change between binocular and monocular vision. As an addition and optionally, the invention permits the distance between the two eyepieces to become adjustable and that a teleconverter can be applied in front of the light amplifier input and possibly also in above described free through-view opening so that magnification can be switched both with and without light amplification.

5 Claims, 4 Drawing Sheets

BINOCULAR NIGHT VISION GOGGLES, WHERE ONE OCULAR COULD BE MOVED FROM THE BEAM PATH

The present invention relates to a compact light-amplifying viewer in accordance with the preamble of claim 1, with a lens and two eyepieces, but with the possibility in accordance with the characterizing clause of claim 1 to completely release, or at least fold down, one of the eyepieces from the light-amplifying viewer, whereby free and unobstructed sight in a wide field of view for one eye through the instrument results, viz. through the free opening which results in place of the removed eyepiece. The arrangement means that the same light-amplifying viewer can be used both binocularly and monocularly.

The invention solves thereby a problem, viz. to satisfy the all more frequently occuring need to be able to change freely between binocular and monocular vision.

Light-amplifying viewers of many different types are known in the prior art: certain are monocular with one lens, a light amplifier and an eyepiece of varying magnification (WO 85/00433). Others are binocular and magnifying observation viewers or head-worn "night viewer goggles" with unity magnification and a lens, a light amplifier and two eyepieces (U.S. Pat. No. 4,463,252 and SE 450 671). We refer to the latter of these patent documents for a detailed description of the existing categories and further references.

Compact binocular light-amplifying viewers for night observations, generally called night viewer goggles or "goggles" for short, are preferably used mounted on a user's supporting mask or helmet, in front of the eyes, whereby the hands are freed for other purposes, for example to steer a vehicle or to use tools at night. There are many advantages (among other things reduced fatigue during a long period of use) if such goggles are binocular, i.e. provided with two eyepieces but there are also situations when one prefers goggles with a single evepiece (monoculars), leaving the other eye free for simultaneous naked observation without light amplifying so that one can with one eye observe the scene light-amplified while the other eye remains naked.

It is therefore a main object of the invention to provide a compact light-amplifying viewer with a single light amplifier, which freely permits both of these two main applications and thus, in accordance with changing requirements, can be used either monocularly or binocularly.

Certainly there exists the other possibility to instead use a monocular light-amplifying viewer in front of each eye, thus a binary system consisting of two monocular amplifying viewers, each provided with a light amplifier, a lens and an eyepiece, where one of these viewers can be folded away or removed during monocular vision. However, since this system solution comprises in total two light amplifiers. which are expensive components, the constellation is uneconomical and also less attractive because all the functions and components are duplicated resulting in high weight, nose heaviness and ungainliness.

Since the distance between the eyes varies for the individual observer, it is a further advantage during binocular use if the distance between the axes of symmetrically of the two eyepieces on the goggles can be regulated so that they symmetrically coincide with the pupils of the observer, resulting in a sharper picture and less light loss (vignetting) at the edges of the field of view. Furthermore, the requirements on the size of the egress pupils (and therewith the dimensions and weight of the lens) are thereby reduced in the instruments which is especially advantageous with increasing fields of view with consequential pupil restrictions.

It is therefore an alternative object to be able to, when required, design it so that one eyepiece furthermore becomes laterally movable in the transverse direction, whereby the distance between the axes of symmetry of the two eyepieces can be varied. For example (but not as a limitation) the arrangement can be practically designed so that one evepiece moves transversely along a so-called dove-tailed groove, on which it consequently runs but in the outer position of which the eyepiece is released and removed from the viewer.

Already in the preamble it can be seen that the invention relates to a compact light amplifying viewer, which will now be described more closely:

A primary constructional object for all night viewer goggles is a short forwardly directed constructional length, resulting in a reduced downwardly directed torque and thereby—as experienced by the user—a reduced weight and moment stress and feeling of tiredness when mounted on the head.

Compact goggles, viz. with especially short such constructional length, are characterized by bending the optical beam path transversely by means of mirrors so that the light amplifier tube and possibly the lens are orientated at an angle to the direction of observation.

Another feature of compact light-amplifying viewers with deflected beam paths is that the input apparatus and the lenses in general are not in the same horizontal plane as the eyepieces and thereby do not obstruct the view in front of the removable eyepiece. The latter is a requirement for being able to also observe the scene directly through the ‚oggles with the naked eye.

It is consequently a main object of this invention to provide a compact light-amplifying viewer with one light amplifier, one lens and two eyepieces, where one of the eyepieces is removable or can be folded down (thereby leaving a free opening through the instrument), furthermore optional permitting a displacement transversely (laterally) in relation to the other eyepiece but with the retention of the short forwardly directed constructional length characterized by a beam deflection by means of at least one mirror (or corresponding prism) between the observed scene and the light amplifier, which thereby is normally orientated at a right angle to the direction of observation.

The invention will now be described on the basis of a number of non-limiting example shown in FIGS. 1, 2A, 2B, 3 and 4:

FIG. 1 shows a light-amplifying viewer according to the preamble, while

FIG. 2B shows alternative construction of the same microscope, while

Figure 1:
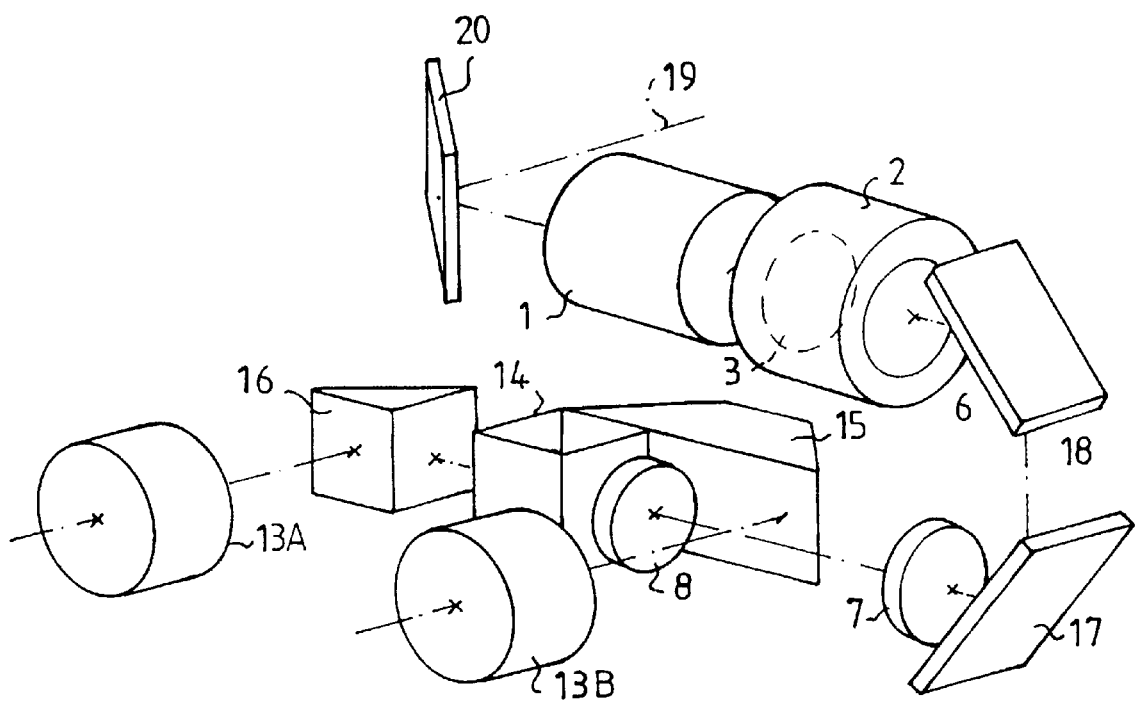

FIG. 1 consequently exemplifies such a compact light-amplifying viewer with one light amplifier and lens orientated perpendicular to the direction of observation, and in a horizontal plane which does not coincide with the eyepieces, all in accordance with the description above and described in the Swedish patent 450 671, wherefrom the drawing is taken.

For more detailed information on this light-amplifying viewer, reference is made to the relevant patent document. Here follows, however, a summary of its most important optical construction principles and a non-limiting exemplification of how the invention can be applied so that a removable and possibly displaceable eyepiece is introduced.

Thus, the light-amplifying viewer according to the example in FIG. 1 (Swedish patent 450 671) consists of a light-amplifier tube 2 orientated horizontally and at right angles to the direction of observation 19. The lens 1 which projects a picture of the scene on the photocathode 3 of the light amplifier tube is here also orientated in the same way and looks out via an objective mirror 20 (or corresponding prism), which reflects the incoming light from the scene being observed 19 at a right angle and in a direction towards the light amplifier 2. This prepares considerably for the compact construction of the light-amplifying viewer, which is primarily aimed at. The light amplifier presents an electronically amplified picture on a screen 6, and this picture is observed by means of an asymmetric observation microscope via a mirror or prism beam divider 14, the function of which is to divide the light into two separate (intermediate) images, one for each eyepiece 13A and 13B, respectively.

In the beam path from the light amplifier 2 to the eyepiece 13A/13B, the observation microscope consists in turn of transport mirrors 17,18, which bend down the beam path of the eyepieces to another horizontal plane under the lens and input aperture according to FIG. 1. A collimation lens 7 then follows which normally produces a collimated (parallel) beam up to the collimation lens 8, still in the common beam path, with the object of reforming an (intermediate) image of the screen 6 of the light amplifier tube (at a suitable distance from the eyepieces). Thereafter follows a beam divider 14, which consequently (here) is not in the collimated beam between the collimator lenses 7 and 8. The beam transmitted through the beam divider reaches the eyepiece 13A via an eyepiece mirror or an eyepiece prism 16 while the beam reflected by the beam divider reaches the eyepiece 13B via two further reflections (prisms or mirrors) 15. Further correction lenses can be present in the beam path, and mirrors can, if necessary, be exchanged for equivalent reflection prisms in the case that constructions advantages can be achieved.

It is now mechanically possible, by means of tested, known techniques and proper geometry and adjustment, to design the eyepiece 13A so that it together with the, in this connection, relevant optical component prism/mirror 16, as a unit, becomes removable or by means of a rotating mechanism can be moved to the side of the instrument, whereby (FIG. 1) a void and a clear view under the lens 1 and mirror/prism 20 opens through the instrument (no other hiding mechanical details need to be here between the removable eyepiece and the scene being observed).

Figure 2A:
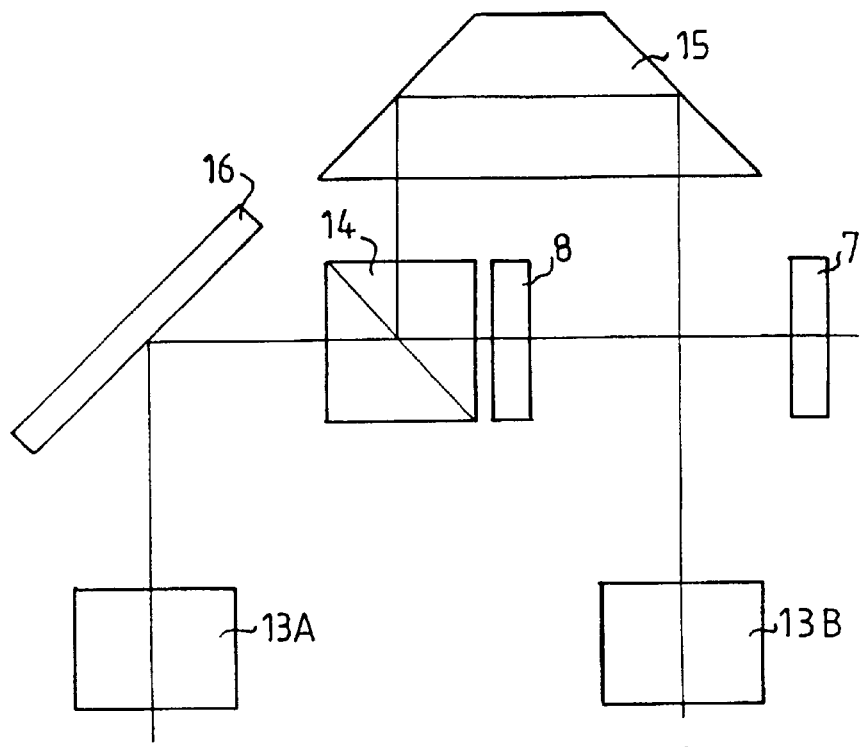
FIG. 2A shows part of the observation microscope of the same viewer in another projection.

On the other hand, here (FIG. 2A) it is not equally practicable to additionally arrange a continuously adjustable distance between the two eyepieces, viz. to move the eyepiece 13A in the transverse direction without refocusing (adjusting the dioptrics) of the eyepiece), the latter an imperative practical requirement because the eyepiece otherwise could end up at widely different distances behind the instrument but also for purely manipulability reasons.

One way of overcoming this would be (FIG. 2A) to move sidewards a large unit consisting of the eyepiece 13A together with the, in this connection, relevant optical components, viz. the mirror 16 and the collimator lens 8, of which the latter named operates in inconing collimated (parallel) light from the lens 7, independent of the lateral displacement, leading in that case to an unchanged dioptrical adjustment of eyepiece 13A even during lateral displacement. But the beam divider 14 must in this case still be held immovable and is therefore in the way for the lateral displacement of the lens 8.

Figure 2B:
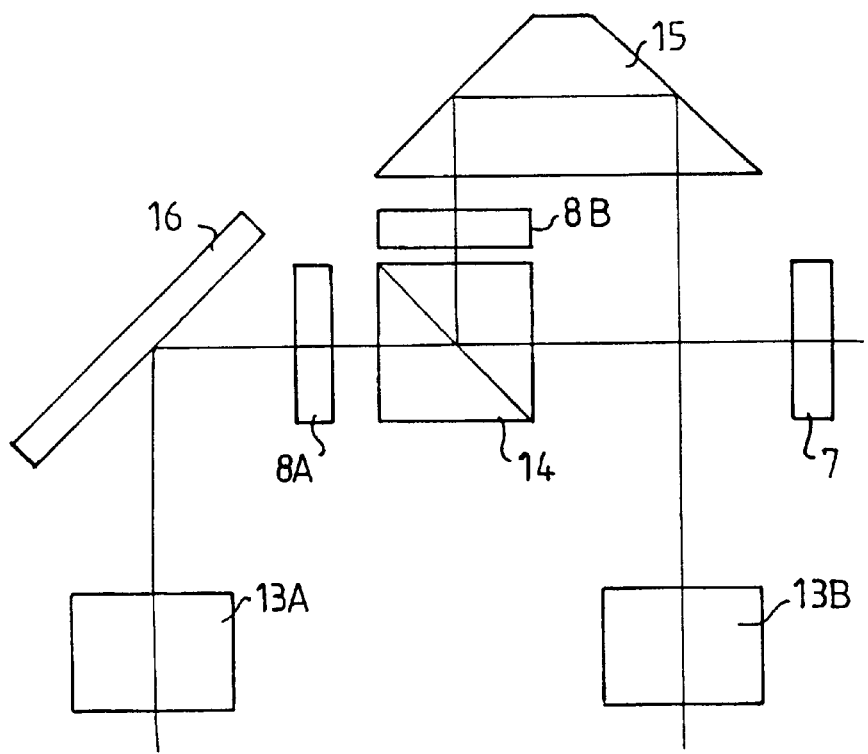

If, however, one instead uses the constructional arrangement according to FIG. 2B, thereby allowing the beam divider 14 and the lens 8 to change places, then the arrangement becomes possible at the price of a duplication (8A and 8B) of the lens 8 (since-it now is after the beam division). Also for the rest, the optical constructional difficulties increase because the two eyepiece channels in this way become optically more and more different (a greater difference in optical length) and even the light losses closer to the beam between the lens 7 and the lens 8A/8B will now pass a considerably longer path.

By means of customary computer-supported calculation work it has, however, been shown to be surprisingly possible to overcome these far from trivial complications, in a technically and econormically attractive way.

Figure 3:
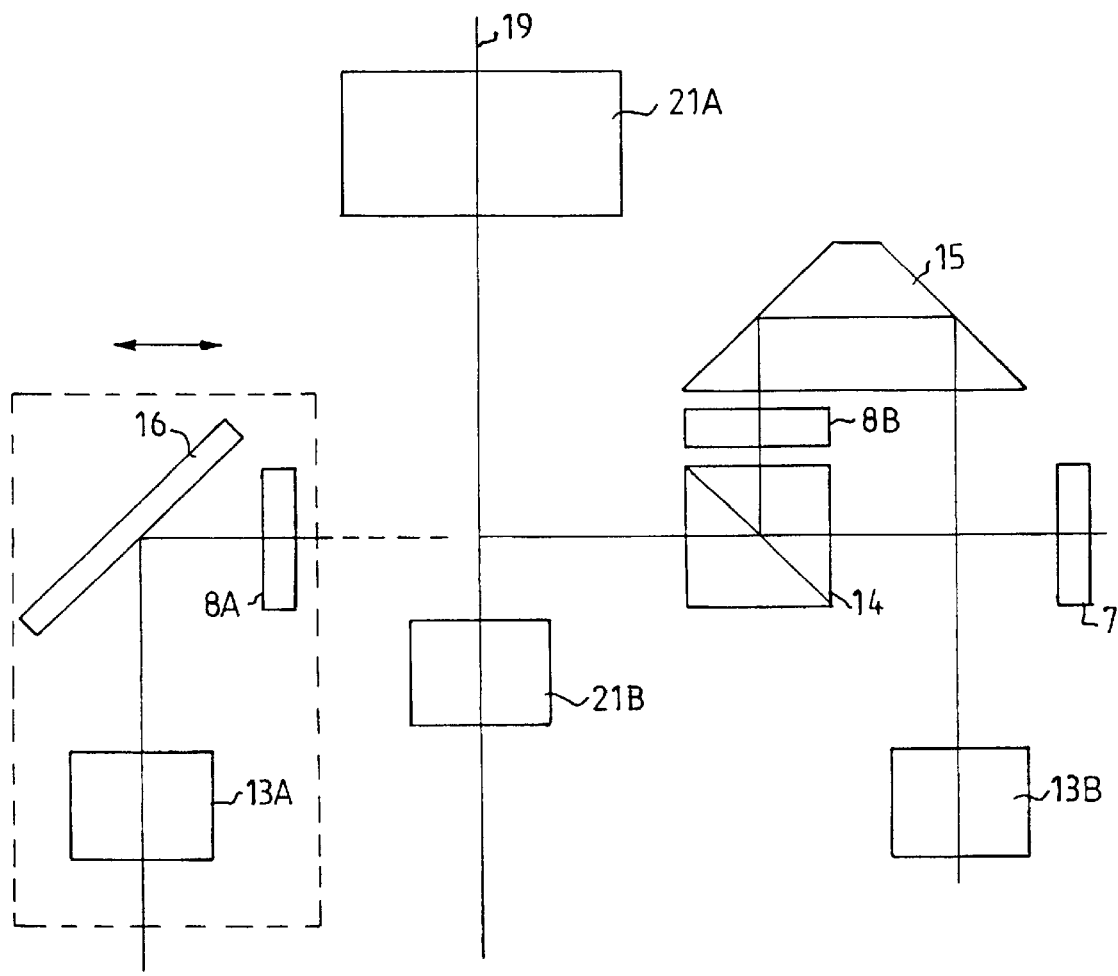
FIG. 3 shows how one eyepiece unit therein can be laterally displaced and possibly a viewer 21 A/B introduced.

Without leaving the inventive concept, the invention can now be extended to comprise yet another application cathegory, to make doubly sure, as a direct consequence of the removability of one of the eyepieces. On the basis of the non-limiting, example in FIG. 3 and FIG. 4, the following description is offered: Through the "removable" eyepiece here forming a void with a clear view through the light amplifier (FIG. 1), even the use without light amplification during daytime or variable light conditions, either with unit magnification (natural), without additional optics, is made possible, by means of observation through the so formed and above described through-vision opening, where one of the eyepieces is removed, or (FIG. 3) through instead of the eyepiece provide a magnifying additional viewer 21A/B (=21A+21B). Such a suitably formed (day)viewer, e.g. of wellknown so-called Gallilei-type (a focal optical unit characterized by the lens 21A with positive diffracting power, eyepiece 21B with negative diffracting power, rightway-up image and short constructional length), can also be placed in front of the input mirror 20 of the light-amplifying viewer immediately above (FIG. 1) the removable eyepiece, and functions thereby as a so-called teleconverter. Such teleconverters with the function of changing the magnification and field of view have for a long time been commercially available for various purposes, e.g. in cameras. Through in a suitable way designing this viewer with among other things well-sized pupils, it is possible to apply it on a light-amplifying viewer both in daytime and at night.

Because the day and night views lie in different horizontal planes but normally beside each other (FIG. 1), it is convenient, according to known mechanical principles, to arrange (FIG. 4) so that this day-viewer/teleconverter by means of a pivot arm (22) or the like can alternatively be flipped in front of for day-viewing 21AD or night-viewing 21AN according to requirements.

The viewer may be constructed to allow a field of view of greater than 45°.

The additional viewer 21A/B receives in this way a "de facto" status of an easily removable magnifying switch (FIG. 4), rotatable according to requirements in both day channel 21AD and night channel 21AN or completely to the side 21AU (for unity magnification both in daytime and at night).

Figure 4:
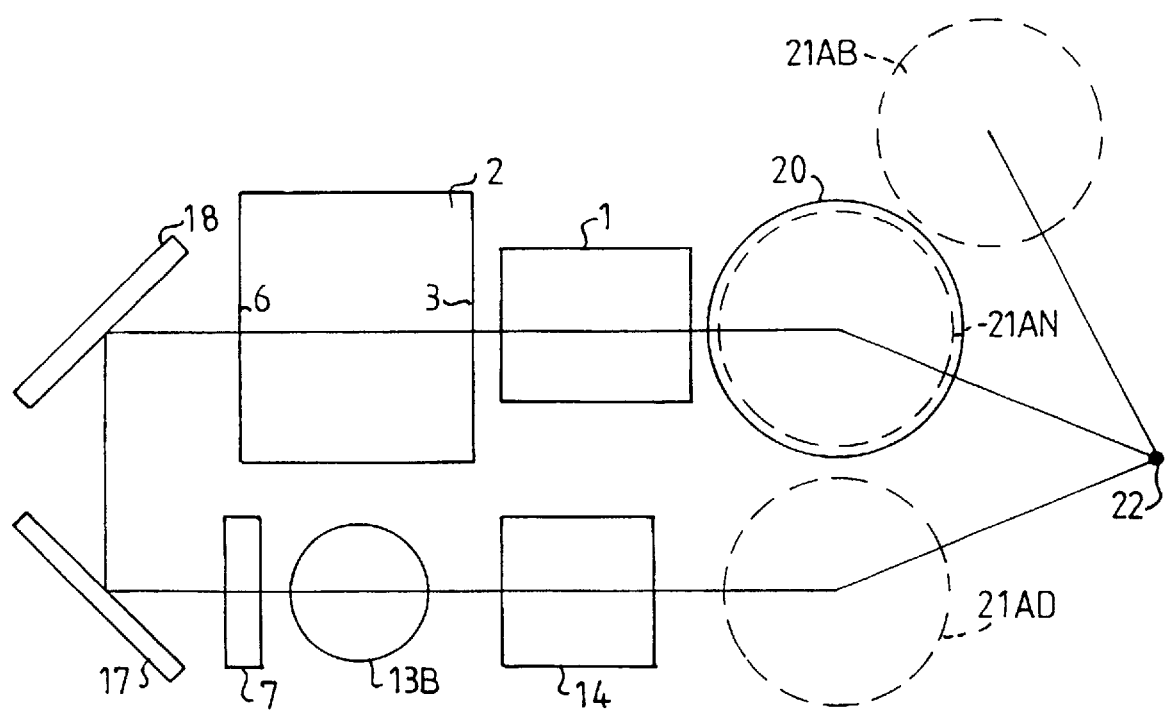
FIG. 4 shows the same viewer rotatable in front of a day- or light-amplified view.

Alternatively, the additional viewer imagnification switch 21A/B can be mechanically and optically integrated with the light-amplifying viewer, to form a single physical unit, viz. a permanent day and night light-amplifying viewer with variable magnification (FIG. 4).

The optical system principles according to the invention can therefore be varied many times and adapted for different applications, and the above presented example is in no way liming for the validity of the invention also with other viewer configurations with light amplifiers.

I claim:

1. Binocular light-amplifying viewer which can be worn on the head, comprising a single light amplifier (2) with an input plane (3) and an output plane (6) for production of a bright image of a scene projected on the input plane, a lens (1) for projecting a scene existing in the direction of the line of sight (19) for the viewer towards the input plane (3), and an observation unit comprising a reflecting element, a beam divider (14), and two eyepieces (13A, 13B) adapted to allow viewing the image formed on the output plane of the light amplifier, wherein a mirror element (20) is arranged in order to reduce the forwardly directed construction length placed between the observed scene and the light amplifier, and optical axes of the eyepieces, when the light amplifying viewer is worn on the head, are situated in a horizontal plane which is separated from a horizontal plane in which a line of sight of the viewer is situated, wherein one of the two eyepieces (13A) and the reflecting element are mechanically releasable as a unit from a remainder of the viewer, so that instead an opening with a free through-view for the eye originally associated with said one of two eyepieces is provided, the viewer functioning monocularly with light amplification at a remaining eyepiece, and with the other eye.

2. Light-amplifying viewer according to claim 1, characterized in that the one eyepiece together with the reflecting element and a lens element between the beam divider (14) and the one eyepiece (13A) are laterally displaceable transversely as a unit, so that thereby the eyepiece distance between the optical axes of the two eyepieces (13A and 13B) is adjustable.

3. Light-amplifying viewer according to claim 1, characterized in that it has unity magnification so that the observer observes the scene in the natural scale.

4. Light-amplifying viewer according to claim 1, characterized in that a lens field of view of at least 45 degrees can be observed.

5. Light-amplifying viewer according to claim 1, further comprising a teleconverter which is moveable so as to be selectively positioned either in front of an input aperture of the light-amplifying viewer or in the opening with the free through-view created by the mechanical release of the one eyepiece and the reflecting unit, so that a degree of magnification of the viewer can be changed both with and without light amplification.

* * * * *

UNITED STATES PATENT AND TRADEMARK OFFICE
CERTIFICATE OF CORRECTION

PATENT NO. : 5,969,859
DATED : October 19, 1999
INVENTOR(S) : Sven-Ake AFSENIUS

It is certified that error appears in the above-indentified patent and that said Letters Patent is hereby corrected as shown below:

On the title page, in Item [86], change "PCT/SR96/01323" to --PCT/SE96/01323--.

Signed and Sealed this

Eleventh Day of April, 2000

Attest:

Q. TODD DICKINSON

Attesting Officer

*Director of Patents and Trademarks*